United States Patent [19]

Holliday et al.

[11] Patent Number: 5,140,610
[45] Date of Patent: Aug. 18, 1992

[54] FM VIDEO DATA LINK SPECTRUM SPREADING

[75] Inventors: Edward M. Holliday; Phillip M Kirshtein; Glenn D. Weathers, all of Huntsville, Ala.

[73] Assignee: The United States of America as represented by the Secretary of the Army, Washington, D.C.

[21] Appl. No.: 772,999

[22] Filed: Oct. 8, 1991

[51] Int. Cl.$^5$ .............................................. H04K 1/00
[52] U.S. Cl. ................................................. 375/1
[58] Field of Search ...................................... 375/1

[56] References Cited

U.S. PATENT DOCUMENTS

| | | | |
|---|---|---|---|
| H484 | 6/1988 | Holliday | 342/201 |
| 3,766,477 | 10/1973 | Cook | 375/1 |
| 4,255,810 | 3/1981 | Solomon et al. | 375/1 |
| 4,513,288 | 4/1985 | Weathers et al. | 343/17.2 PC |
| 4,580,139 | 4/1986 | Weathers et al. | 343/17.1 R |

*Primary Examiner*—Salvatore Cangialosi
*Attorney, Agent, or Firm*—Hugh P. Nicholson; Freddie M. Bush

[57] ABSTRACT

A video data link system utilizes spread spectrum to decrease the susceptibility of a low power video link to radio frequency countermeasures. The video data link system utilizes a combination of spread spectrum direct-sequence modulation and frequency-hop along with frequency modulation to provide spectral spreading of radio frequency energy to a bandwidth much greater than the information bandwidth. The direct sequence modulation allows minimization of the number of frequency steps required for complete spectral filling of the operational bandwidth on an average basis. Frequency hop timing is determined from the phase of the direct sequence generator to simplify the frequency hop synchronization process in the receiver. Bandwidth of the fm video signal, after being spread in spectral width by the bi-phase direct sequence signal, is approximately equal to the direct pseudo random sequence clock rate. Spacing of the frequency hop step is matched to the direct sequence bandwidth to relate each frequency stepped subcarrier harmonically to the fundamental sequence clock, thereby allowing simpler generation of the de-hop sub-carriers in the receiver.

11 Claims, 5 Drawing Sheets

FM VIDEO DATA LINK SPECTRUM SPREADING

DEDICATORY CLAUSE

The invention described herein may be manufactured, used, and licensed by or for the Government for governmental purposes without the payment to us of any royalties thereon.

BACKGROUND OF THE INVENTION

Video data links are generally susceptible to intentional or unintentional jamming signals. This is especially true for video data links intended for military application in an aerial vehicle, which may be subject to an intense countermeasures environment. A countermeasures environment may include jamming signals intended to mask a desired video link signal between ground stations or relay points.

SUMMARY OF THE INVENTION

A video data link system that utilizes spread spectrum to decrease the susceptibility of a low power video link to radio frequency countermeasures. A basic frequency modulation system is used such as that employed on video instrumentation transmitter/receiver systems. In operation, the video data link system utilizes a combination of spread spectrum direct-sequence modulation and frequency-hop along with frequency modulation to provide spectral spreading to a bandwidth much greater than the information bandwidth. The direct sequence modulation allows minimization of the number of frequency steps required for complete spectral filling of the operational bandwidth on an average basis.

DESCRIPTION OF THE PREFERRED EMBODIMENT

The video data link spectrum spreading/despreading system utilizes a combination of direct sequence modulation, where the direct sequence is from a pseudo random sequence generator, and a frequency hop sequence. The frequency hop timing is determined from the state or phase of the direct sequence generator in order to simplify the frequency hop synchronization process in the receiver. The bandwidth of the fm (frequency modulation) video signal, after being spread in spectral width by the bi-phase direct sequence signal, is approximately equal to the direct pseudo random sequence clock rate. The spacing of the frequency hop step is matched to the direct sequence bandwidth so that each frequency stepped subcarrier is harmonically related to the fundamental sequence clock. This allows simpler generation of the de-hop sub-carriers in the receiver. The direct sequence modulation thus allows the minimization of the number of frequency steps required for complete spectral filling of the operational bandwidth on an average basis. A typical selection of direct sequence clock rate of 50 MHz supports a low cost implementation by allowing frequency hop subcarriers to be separated by 50 MHz, and allowing inexpensive digital sequence generation.

The description of the frequency modulation (fm)/direct sequence (ds)/frequency hop (fh) system is presented in two parts. First, the transmitter/receiver system for a fm/ds system is disclosed. Second, a description of an enhancement to the fm/ds system to introduce frequency hopping is disclosed in the receiver system. A computer aided direct sequence lock subsystem is used to avoid false locks of the pseudo-random direct sequence. A means of introducing synchronization of the direct sequence clock and of the frequency hop timing to the video horizontal and/or vertical synchronization signals is also disclosed.

The composite system is capable of protection of low power video links from rf (radio frequency) countermeasures (jamming), and provides a means of achieving this protection in a low-cost manner. Low cost is achieved through maintaining all signal path operations as analog operations. That is, the video signal is not digitized, and with the exception of the pseudo-random sequence generation and computer aided synchronization, all operations, such as signal mixing, signal combining, and signal conditioning are analog. The countermeasures protection afforded by this system is not as great as some systems which digitize the video signal and include techniques such as error control coding and interleaving; however, the protection afforded is appropriate where a moderate level of anti-jam capability is adequate and where the cost and complexity of the video transmitter and receiver system must be low.

Figure 1:
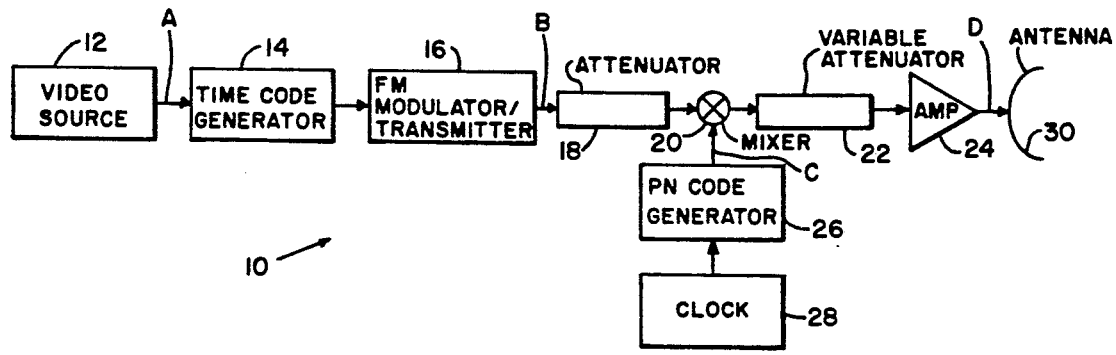
FIG. 1 is a block diagram of the frequency modulation/ direct sequence transmitter system.
Figure 2A:
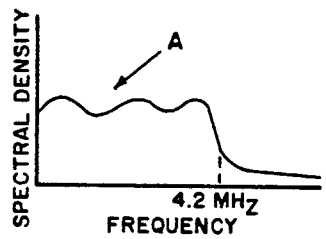
FIGS. 2A-2D show the signal spectral density at various points in the transmitter of FIG. 1.
Figure 2B:
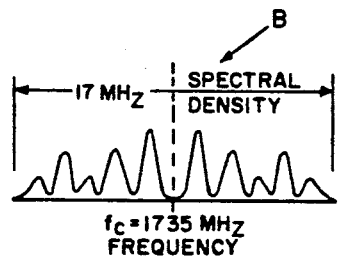
Figure 2C:
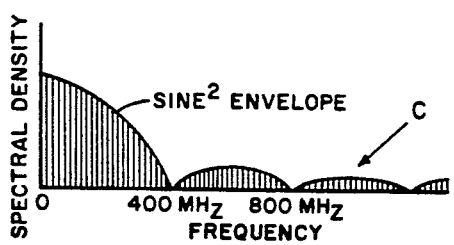
Figure 2D:
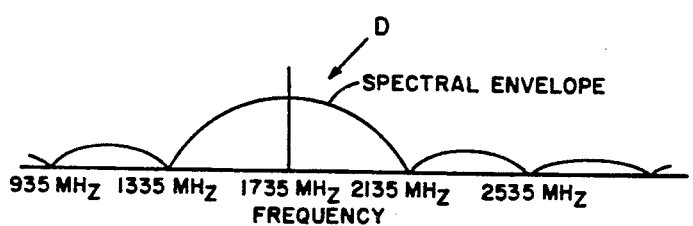

Referring now to the drawings wherein like numbers refer to like parts, FIG. 1 is a block diagram of the fm/ds transmitter 10. A video source 12 such as a video cassette recorder/player 12 or television camera generates a baseband video signal A as shown in FIG. 2A and which has a high spectral density that drops off and becomes very low at about 4.2 megahertz (MHz). Video signal A is operated on by a time code generator 14 and subsequently modulates a carrier signal generated by FM modulator/transmitter 16 to produce the modulated output B as shown in FIG. 2B wherein the spectrum density is shown over 17 MHz bandwidth centered at $f_c = 1735$ MHz. The signal is then coupled sequentially through an attenuator 18, a mixer 20, and another attenuator 22 to an amplifier 24. The attenuators are variable and provide adjustment of the signals for proper mixing and input to the amplifier. A pseudo random noise (PN) code generator 26 is clocked (for example at 400 MHz) by clock 28 to provide a pseudo-random code sequence as shown in FIG. 2C for bi-phase modulating the fm modulated carrier in mixer 20. The resulting output signal from amplifier 24 that is coupled to antenna 30 is the spread spectrum transmitted signal D shown in FIG. 2D having a spectral envelope centered at 1735 MHz.

Figure 3:
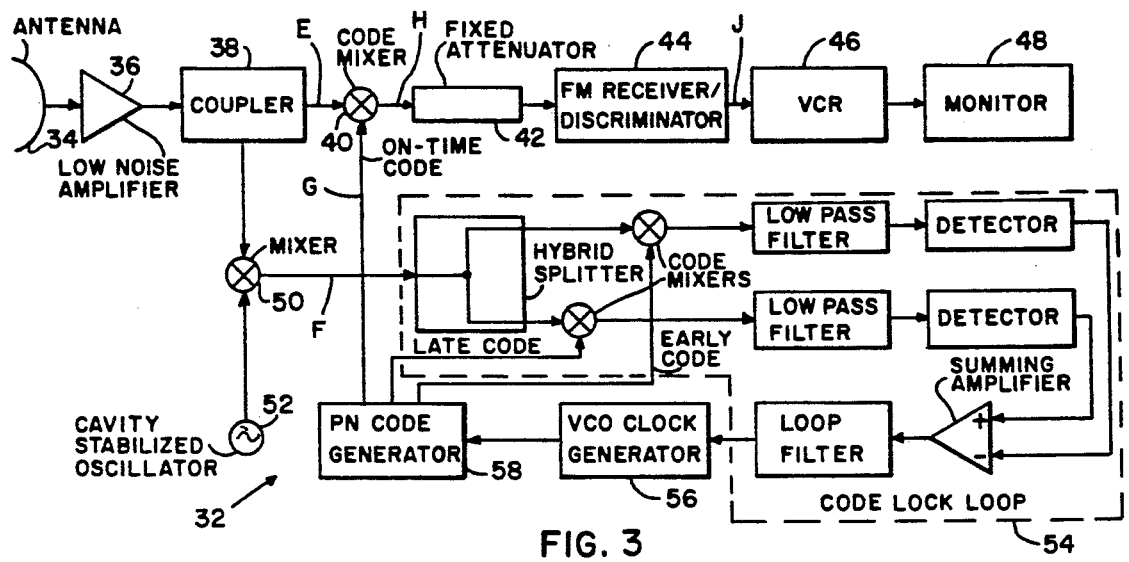
FIG. 3 is a block diagram of the frequency modulation/ direct sequence receiver system with a code-lock-loop.
Figure 4A:
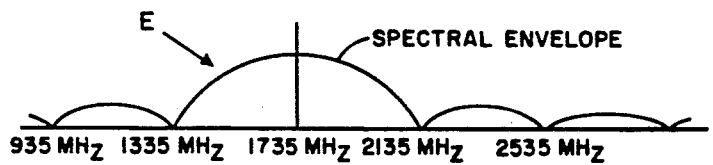
FIGS. 4A-4E show the signal spectral density corresponding to various points in the receiver of FIG. 3.
Figure 4B:
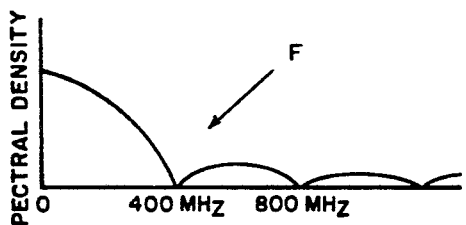
Figure 4C:
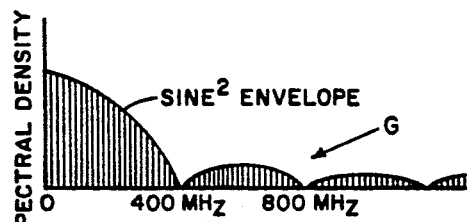
Figure 4D:
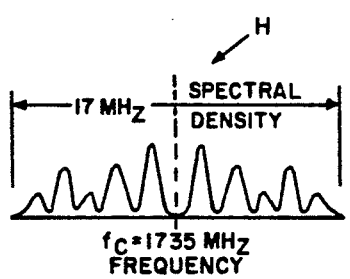
Figure 4E:
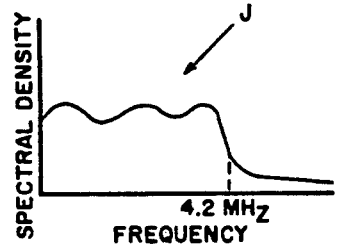

FIG. 3 is a block diagram of the receiver system 32, which includes a code-lock-loop with non-coherent detection of the code-early and code-late signals. The input signals received at antenna 34 are coupled through amplifier 36, a 3 dB coupler 38, mixer 40, attenuator 42, and FM receiver/discriminator 44 to a video cassette recorder (VCR) 46 where it is recorded and may be viewed then or later on monitor 48. An output of coupler 38 is mixed in mixer 50 with the output from a cavity stabilized oscillator 52 (at 1735 MHz) and coupled into the code-lock-loop circuitry 54. The cavity stabilized oscillator translates the spread spectrum signal to spread spectrum baseband. The required stability of the oscillator is such that when early and late codes are partially correlated with the received signal in code-lock-loop 54, the resulting despread signal following the early and late code mixers, will be centered within 17 MHz of dc to pass these signals through low pass filters. Energy passing through the low pass filters is envelope detected, the respective early and late signals are then summed, and the resulting signal is coupled through a loop filter and used as a control signal to control the generator clock (vco) 56 for PN code generator 58. Code generator 58 provides the output to code mixer 40 and provides the early/late codes to loop 54. When the non-coherent code-lock-loop is locked, the on-time code despreads the received signal, and the resulting video fm modulated carrier drives the fm discriminator. FIG. 4 gives the signal spectral density at several points within the code-lock-receiver system with reference to FIG. 3. These include at reference point E the received spread spectrum signal (FIG. 4A), the received signal F translated to baseband (FIG. 4B), the PN code G in FIG. 4C, the despread video modulated fm carrier H in FIG. 4D, and the demodulated baseband video J in FIG. 4E. The rf bandwidth of this fm/ds system is controlled by the pseudo random sequence generator clock rate, shown typically as 400 MHz in FIG. 4C.

Figure 5:
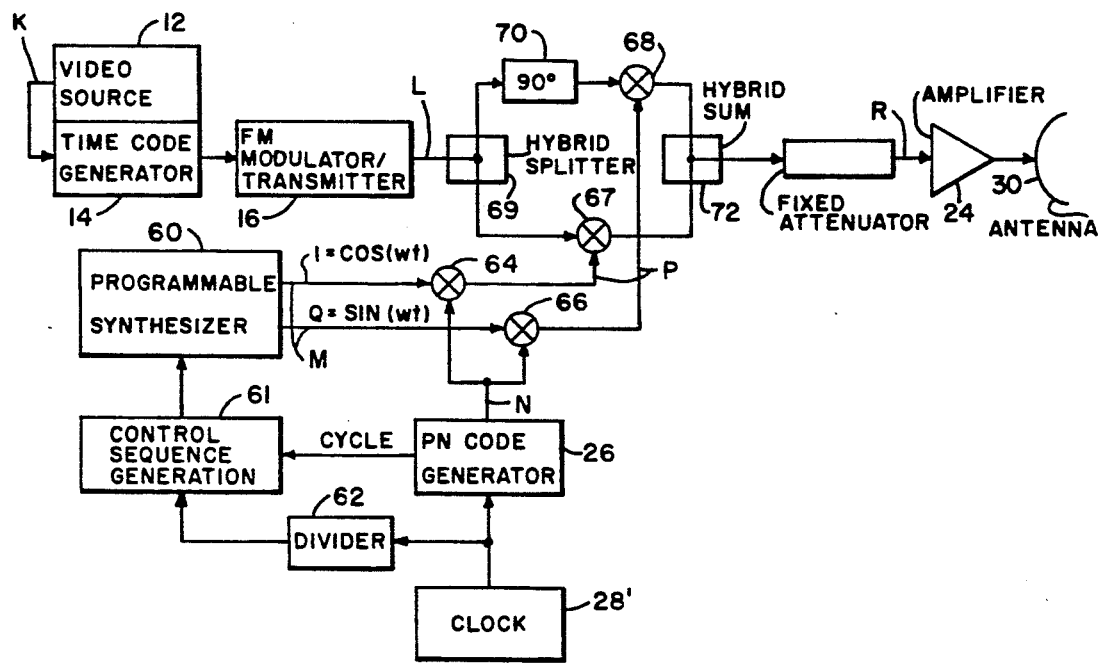
FIG. 5 is a more detailed block diagram of the transmitter system and includes the frequency-hop capability.
Figure 6A:
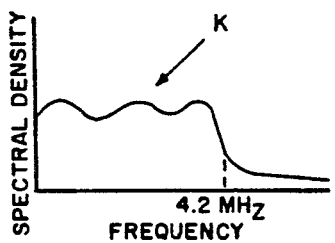
FIGS. 6A-6F show the signal spectral densities corresponding to related points in the transmitter spectrum of FIG. 5.
Figure 6B:
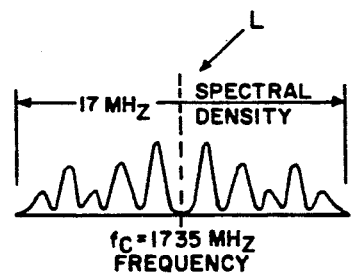
Figure 6C:
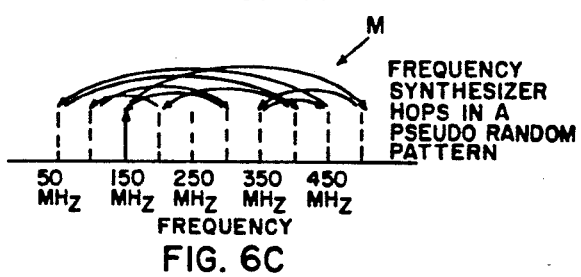
Figure 6D:
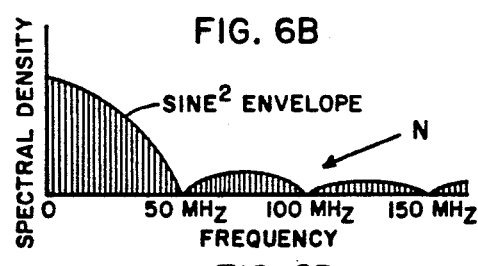
Figure 6E:
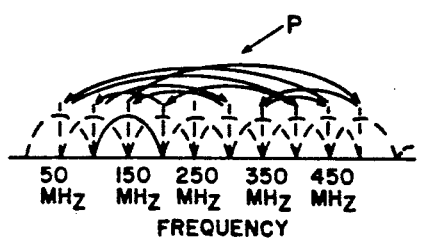
Figure 6F:
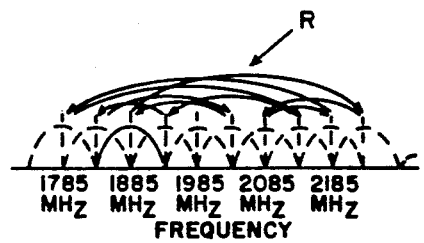

FIG. 5 is a block diagram showing how the frequency-hop capability is introduced into the fm/ds transmitter system of FIG. 1. The resulting fm/ds/fh system allows the coverage of 500 MHz of operating bandwidth, but reduces the direct sequence generator clock rate to 50 MHz. A programmable frequency synthesizer 60 is required to achieve 10 frequencies of operation between 50 MHz and 500 MHz. The frequency hop synthesizer 60 is controlled by a control sequence generator 61, which is driven by the direct sequence clock 28'. The output of clock 28 divided in frequency by a divider 62 and is also synchronized to the "cycle" or "state" of the PN code generator 26. This synchronization of the direct sequence and frequency hop allows simplified frequency hop synchronization in the receiver system. That is, the direct sequence pseudo random code instantaneously reflects the state of the PN sequence generator, and in turn indicates the frequency hop sequence.

As shown in FIG. 5, video source 12, generator 14, modulator/transmitter 16, amplifier 24, antenna 30, and PN code generator 26 are identical to those components shown in FIG. 1. Clock 28' is different only in that a different frequency (50 MHz) is used, as noted above. The signal output from PN code generator 26 coupled to mixers 64 and 66 are mixed respectively with cosine and sine signal outputs from the programmable synthesizer 60 in synchronization with the generator 26 cycle output. The respective outputs from mixers 64 and 66 are coupled respectively to mixers 67 and 68 in the signal path or output path from fm transmitter 16. Hybrid splitter 69 and phase shifter 70 then allows the FM modulation output signal L to be mixed or modulated before being summed in hybrid 72 to allow the frequency hopping to occur.

FIG. 6 shows typical signal spectral densities at several points in the fm/ds/fh transmitter system. These include the baseband video K in FIG. 6A, the fm modulated carrier L in FIG. 6B, the output of the frequency synthesizer M in FIG. 6C, the output of the PN code generator N in FIG. 6D, the hopped PN code spectrum P in FIG. 6E, and the transmitted spectrum R in FIG. 6F. All spectral densities are referenced to FIG. 5.

Figure 7:
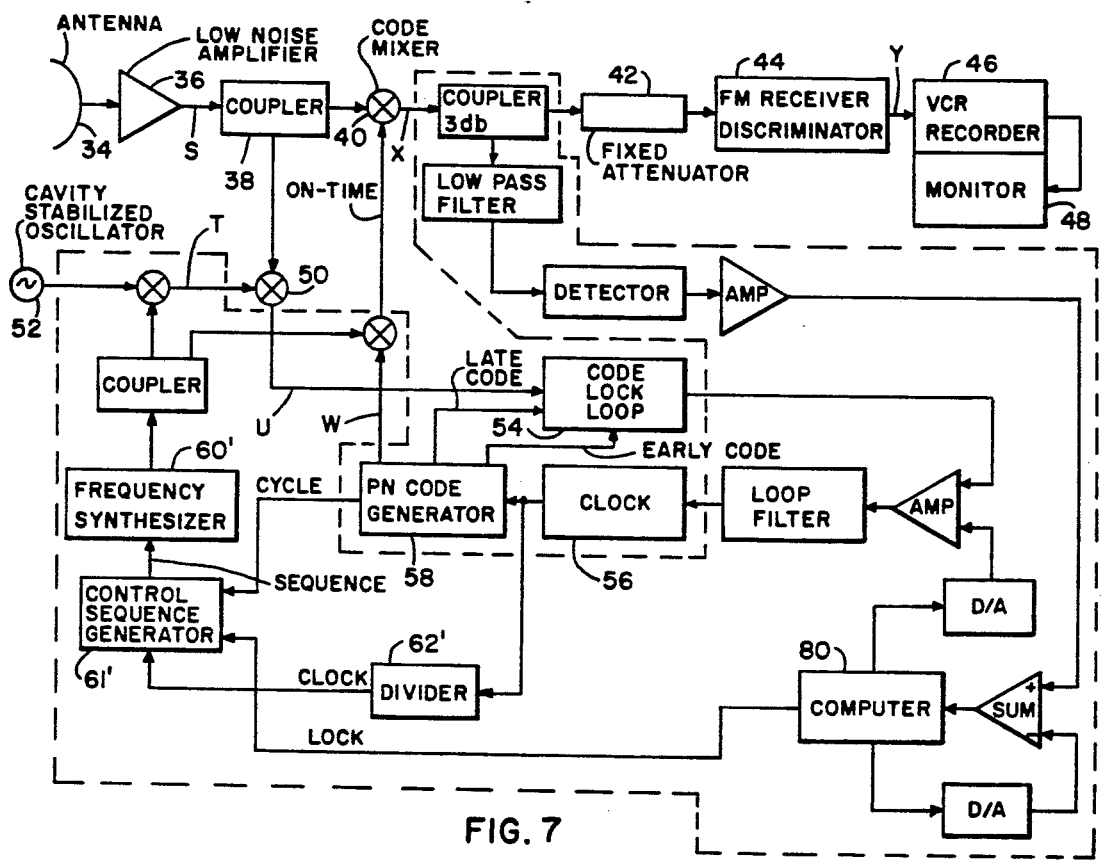
FIG. 7 is more detailed block diagram of the receiver system, including the code-lock-loop synchronization to frequency-hop.

FIG. 7 is a block diagram of the fm/ds/fh receiver system. The system shown in FIG. 7 is an extension of the receiver system of FIG. 3, with the addition of a synchronized frequency hop into the synthesis of the despreading reference signal. The control sequence generator 61, for the frequency synthesizer 60' is driven by the PN sequence generator clock 56, and is synchronized to the state of the PN generator 58. This controller also receives commands from a computer subsystem 80 that has been introduced into the receiver system. This frequency hop circuitry is shown in dashed lines in FIG. 7.

Figure 8A:
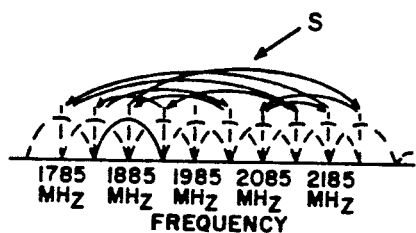
FIGS. 8A-8F show the signal spectral densities occurring at several points in the receiver of FIG. 7.
Figure 8B:
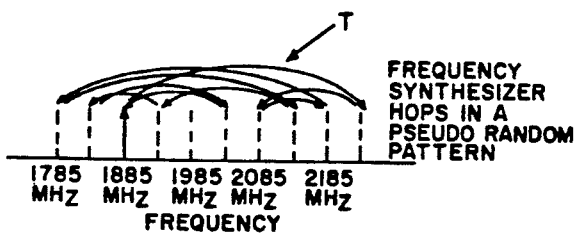
Figure 8C:
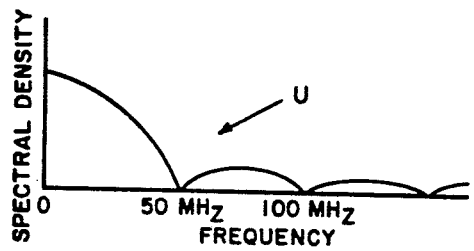
Figure 8D:
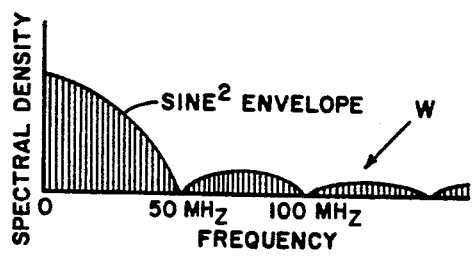
Figure 8E:
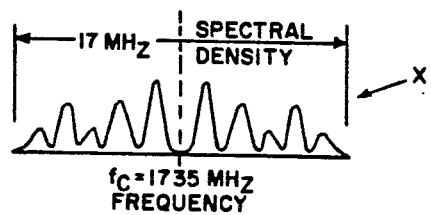
Figure 8F:
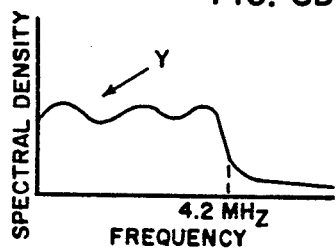

The computer 80 and associated digital-to-analog interfaces in FIG. 7 provides the function of evaluating a direct sequence lock condition, to assure that it is not a false-lock. This function is achieved through evaluating the energy in the 17 MHz bandwidth to the energy in the 50 MHz bandwidth from the despread on-time channel (signal X in FIG. 8E). A properly locked condition is characterized by an average higher spectral density in 17 MHz than in 50 MHz. If the computer detects a false lock, then the code-lock-loop control signal is pulsed by the computer to force the loop out of the false lock, and allow a continued search for the correct PN generator lock synchronization.

The computer also controls the frequency hop sequence in the receiver. The computer holds the controller 61' until a direct sequence lock is declared, then the controller is informed that a sequence lock has occurred. At this point, the controller holds the frequency synthesizer 60' until a cycle or state command has been received from the PN code generator. Since the frequency hop sequence in the transmitter of FIG. 5 was synchronized to the state of the PN code generator 26 in the transmitter, and since the receiver first achieves PN code synchronization, then knowledge of the state of the PN code generator 26 is known by the frequency synthesizer controller 61'. The controller 61' then has all the information to control the frequency hop sequence in the receiver by counting clock pulses from the synchronized PN clock. If the receiver system loses direct sequence or frequency hop synchronization, the computer detects this loss of lock, and returns the frequency hop controller to a "wait" condition, ready to start the resynchronization process.

FIG. 8 gives a representation of the spectral density at several points within the receiver system, referenced to the block diagram in FIG. 7. These include the received spectrum S in FIG. 8A, the frequency synthesizer output T in FIG. 8B, the received signal translated to baseband U in FIG. 8C, the PN code reference sequence W in FIG. 8D, the despread fm modulated carrier X in FIG. 8E, and the demodulated baseband video Y in FIG. 8F. All spectral plots shown assume a receiver synchronization lock to the received spread spectrum signal.

The frequency synthesizer 60, in the receiver system is not coherent with the frequency synthesizer 60 in the transmitter (FIGS. 7 and 5). Coherence is not necessary, it is only necessary that the reference frequency hop synthesizer translate the spread spectrum signal so that when mixed with a reference PN code that the bulk of signal energy collapses to 17 MHz low-pass band and synchronization can be maintained.

Figure 9:
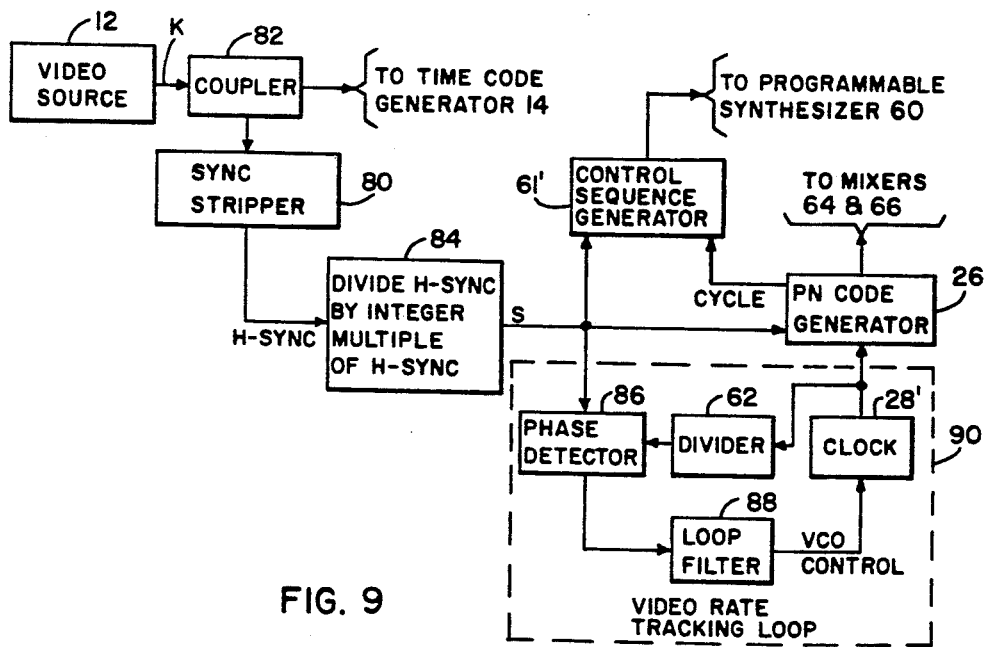
FIG. 9 shows a circuit which allows locking of the PN chip rate and frequency hop rate.

Since the frequency-hop synthesizers are not phase coherent, a frequency hop event could result in a transient "noise-spike" output from the discriminator in the FM receiver. FIG. 9 shows an enhancement to the fm/ds/fh transmitter system of FIG. 5 which allows locking of the PN chip (code) rate of generator 26 and the frequency hop rate of synthesizer 60 to the source video frame or horizontal line rate (synchronization signals). To accomplish this a sync stripper 80 is coupled through coupler 82 to receive a portion of the baseband signal K and couples the horizontal synchronization pulses in the transmitted signal to a divider circuit 84 which provides a horizontal synchronization signal S to the control sequence generator 61', PN code generator 26 and to a phase detector 86. Phase detector 86 is part of a feedback loop for clock 28' and divider 62, coupling feedback through a filter loop 88 to clock 28, for controlling the clock rate. This feedback control loop is shown in dashed lines as the video rate tracking loop 90. This locking assures that the discriminator noise spike will occur during horizontal or vertical retrace period of the video frame. FIG. 9 shows the control sequence for frequency hop and PN code generator clock locked to the horizontal synchronization signal, where the frequency hop rate is the horizontal line rate divided by a selectable constant. The fundamental clock may, alternatively, be locked to the vertical synchronization signal by use of the video-rate tracking loop as shown in the figure.

Obviously many modifications and variations of the present invention are possible in the light of the above teachings. It is therefore to be understood that within the scope of the appended claims the invention may be practiced otherwise than as specifically described.

We claim:

1. In a communications system video data link for transmitting video information from a first point to a second point where signals are subsequently received, said data link having a video source signal that is frequency modulated prior to transmission and said received signals are received, discriminated, recorded, and monitored; the improvement comprising the method of transmitter-receiver synchronization to achieve spectrum spreading:
   generating a time code onto a video source baseband signal prior to frequency modulation and transmission of said signal from a transmitter;
   generating a direct sequence code at a preset high frequency clock rate;
   mixing the direct sequence code with the transmitted, time coded, frequency modulated, video signal to obtain a spread spectrum signal output; and
   amplifying said spread spectrum signal and transmitting said signal from an antenna.

2. A method as set forth in claim 1 and further comprising the steps of:
   receiving said transmitted spread spectrum signal,
   translating a first portion of said spread spectrum signal to baseband;
   coupling said translated baseband signal through a clock generator and a direct sequence code generator to obtain a reference code signal corresponding to the direct sequence code generated at the preset high frequency clock rate;
   mixing the direct sequence code with a second portion of said spread spectrum signal to obtain a despread radio frequency signal; and
   demodulating said despread radio frequency to obtain the synchronized baseband video signal generated by said video source.

3. A method as set forth in claim 2 wherein said steps of coupling said translated baseband signal further comprises the steps of:
   splitting said translated baseband signal into first and second signal paths;
   mixing signals on said first and second signal paths with respective early and late codes to provide first and second coded output baseband signals at an intermediate frequency;
   recombining and amplifying said signals in a difference amplifier; and
   filtering the output baseband signal from said difference amplifier prior to coupling said translated baseband signal through the clock generator and direct sequence code generator and thereby providing a code-lock-loop.

4. In a communications system video data link wherein a plurality of radio frequency signals are transmitted and subsequently received, said data link having a video source signal that is frequency modulated prior to transmission and said received signals are received, discriminated, recorded, and monitored; the improvement comprising the method of transmitter-receiver synchronization to achieve spectrum spreading:
   frequency modulating and transmitting a time coded baseband video signal from a video source;
   generating a PN code at a preset mid-frequency clock rate;
   coupling said generated PN code to respective first and second mixers;
   driving in sequential steps a programmable frequency synthesizer to provide first and second output signals along signal paths shifted in phase by 90 degrees and stepped in equal mid-frequency steps in a pseudo random pattern;
   directing output signals from said synthesizer along said first and second output signal paths to said first and second mixers respectively for obtaining respective first and second frequency-hopped, PN coded outputs therefrom;
   combining said first and second frequency-hopped PN coded outputs respectively, along separate and distinct signal paths, with said frequency modulated time coded baseband video signal;
   summing the respective combinations of frequency-hopped, PN coded outputs with the frequency modulated and time coded baseband video signals to provide an output spectrum of hopped PN coded signals; and
   amplifying and transmitting said spectrum of hopped PN coded signals toward a receiver region.

5. A method as set forth in claim 4 and further comprising the steps of:

receiving said amplified and transmitted spectrum of PN coded signals by a receiver region, and reducing said received spectrum signals to obtain the demodulated time coded baseband video signal originally generated by said video source.

6. A method as set forth in claim 5 wherein, prior to the step of combining, the method further comprises the steps of:

dividing said frequency modulated, time coded baseband video signal along first and second video signal paths; and phase shifting video signals coupled on said second video path by 90 degrees to obtain a 90 degree phase shifted video signal with respect to said first video path; and wherein said step of combining is accomplished by combining in the first and second frequency-hopped, PN coded outputs respectively with signals on the first and second video path prior to the step of summing.

7. A method as set forth in claim 6 and further comprising the steps of:

receiving and amplifying said transmitted spectrum of hopped PN coded signals by said receiver region; and reducing the received and amplified spectrum of hopped PN coded signals to obtain the demodulated baseband video signal generated by said video source.

8. A method as set forth in claim 7 wherein said step of reducing said received and amplified spectrum of hopped PN coded signals further comprises the steps of:

translating a first portion of said received and amplified spectrum to baseband;

processing the translated baseband signal through a code locking loop and code generation circuit to obtain a reference code signal indicative of the PN code generated at a preset mid-frequency clock rate;

mixing the reference code signal with a second portion of said received and amplified spectrum to obtain a despread, frequency modulated, radio frequency signal; and demodulating said despread radio frequency to obtain the demodulated baseband video signal generated by said video source.

9. A method as set forth in claim 8 wherein, prior to the step of demodulating to obtain the demodulated baseband video signal, the method further comprises the steps of:

coupling a portion of the despread, frequency modulated, radio frequency signal into a control loop to feedback a portion of the instantaneous despread signal into the control loop path; and controllably driving in sequential steps a frequency synthesizer to provide a mid-frequency pseudo random pattern, stepped output that is correlated by said instantaneous despread signal to the pseudo random pattern in said transmitted spectrum.

10. A method as set forth in claim 5 and further comprising the steps of:

stripping synchronization signals from a portion of the baseband video signal;

locking a frequency hop rate of the programmable synthesizer and the PN code rate to the synchronization signals to assure blockage of transient discriminator noise spikes from the reduced, received spectrum signals.

11. A method as set forth in claim 9 and further comprising the steps of:

stripping synchronization signals from a portion of the baseband video signal;

locking a frequency hop rate of the programmable synthesizer and the PN code rate to the synchronization signals to assure blockage of transient discriminator noise spikes from the reduced, received spectrum signals.

* * * * *